May 3, 1960

C. W. VOGT 2,934,867

PACKAGING FLUENT PRODUCTS

Filed July 30, 1956

INVENTOR.
CLARENCE W. VOGT
BY
HIS ATTORNEYS

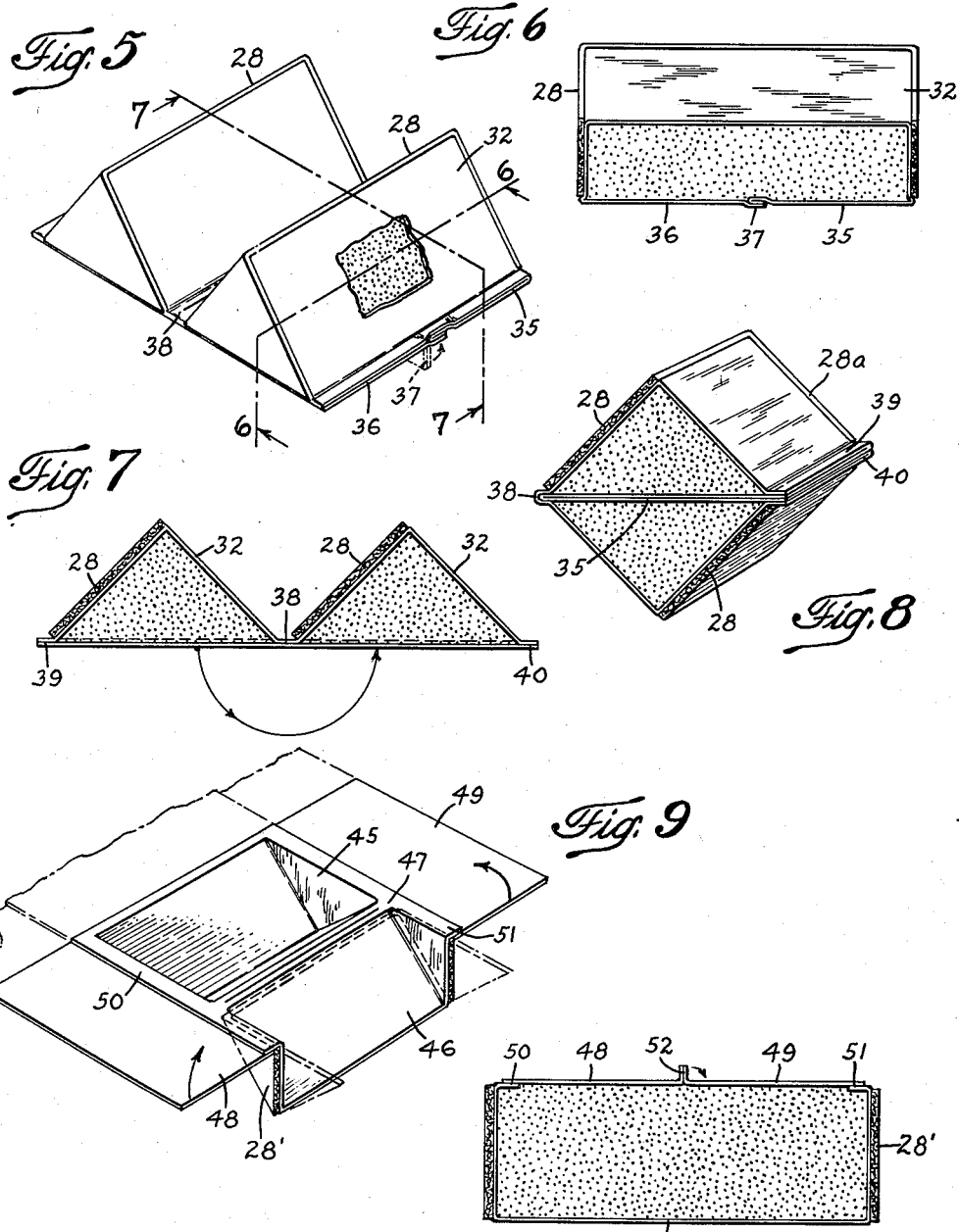

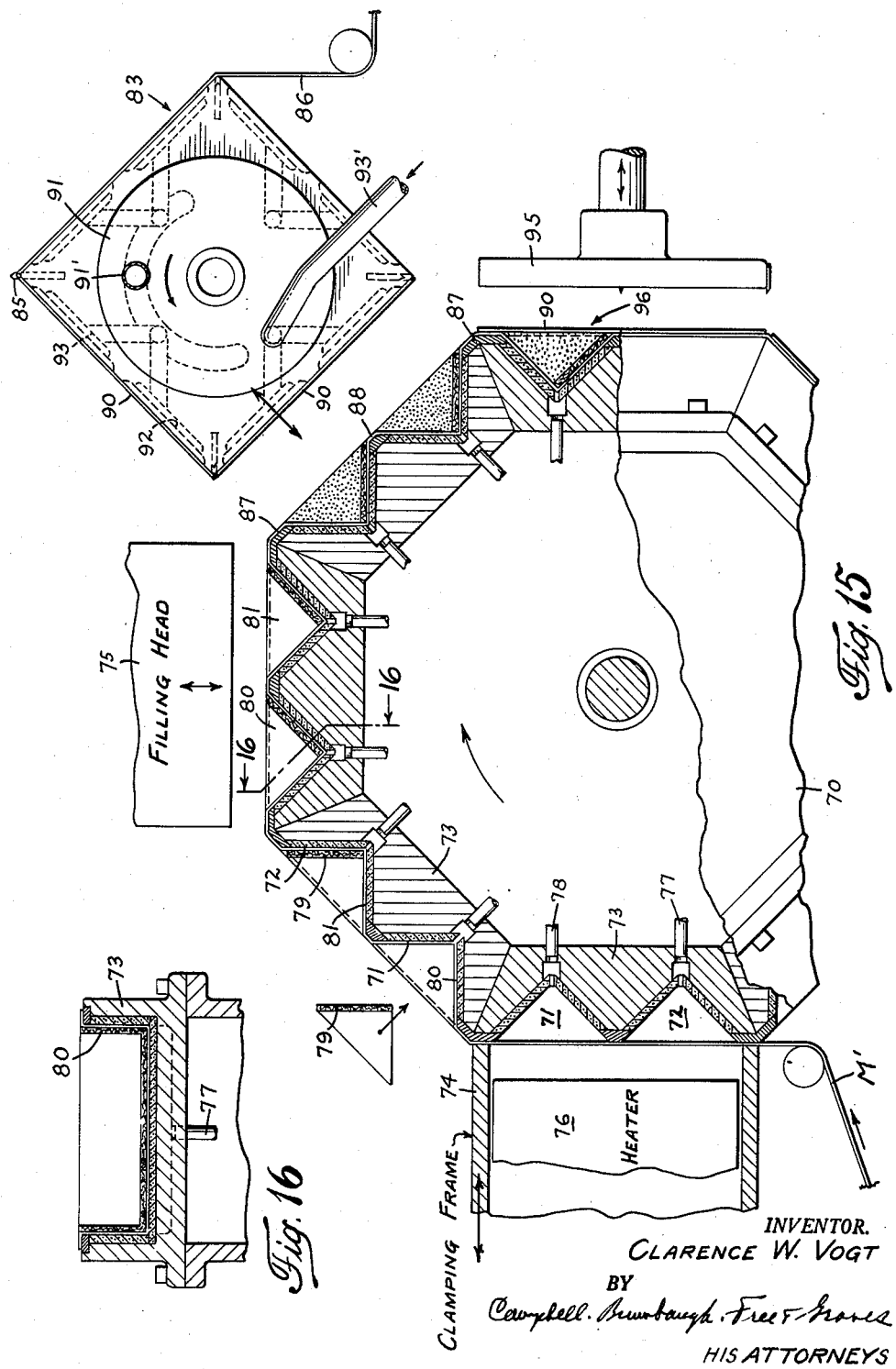

May 3, 1960
C. W. VOGT
2,934,867
PACKAGING FLUENT PRODUCTS
Filed July 30, 1956
4 Sheets-Sheet 4
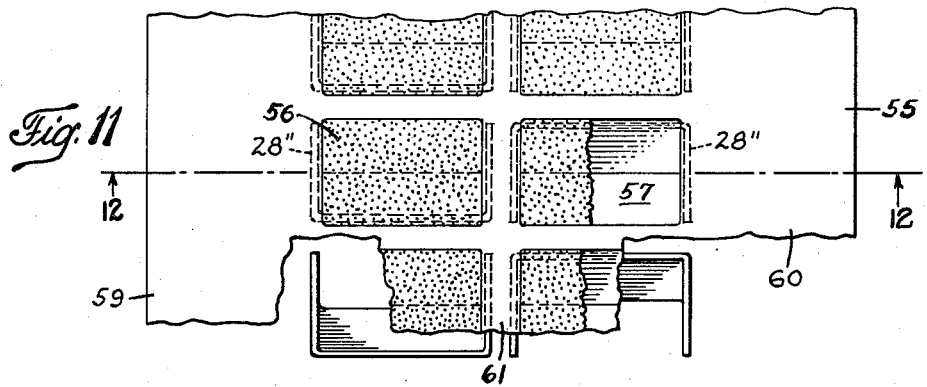
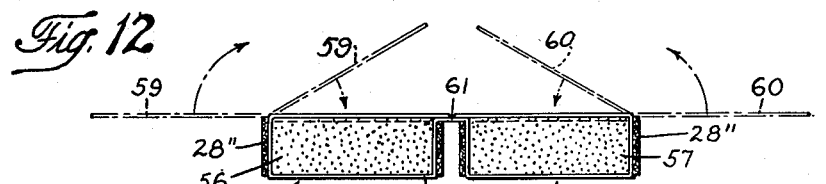
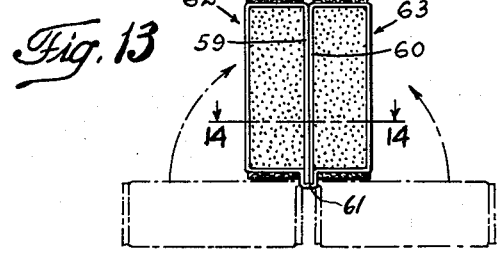
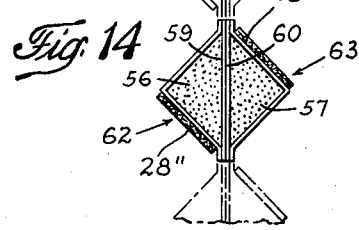
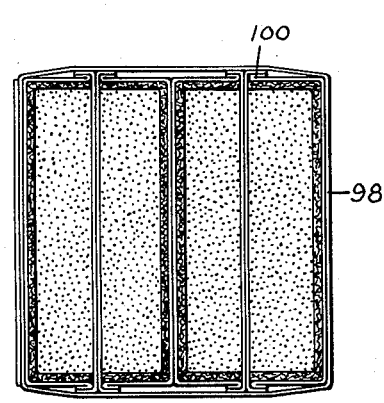
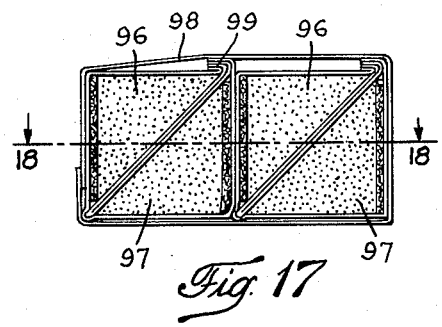
INVENTOR.
CLARENCE W. VOGT
BY
Campbell, Brumbaugh, Free & Graves
HIS ATTORNEYS

United States Patent Office 2,934,867
Patented May 3, 1960

2,934,867

PACKAGING FLUENT PRODUCTS

Clarence W. Vogt, Weston, Conn.

Application July 30, 1956, Serial No. 601,030

8 Claims. (Cl. 53—30)

This invention relates to improvements in methods of forming and filling packages with powdered, pulverulent or other fluent materials and to the resulting packages, and it relates particularly to reinforced packages and methods of producing such packages.

As shown in my co-pending applications Serial No. 585,775, filed May 18, 1956, Serial No. 594,152, filed June 27, 1956, and Serial No. 595,249, filed July 2, 1956, I have provided apparatus by means of which sheets or films of thermo-plastic material can be deformed to fit into cavities of a mold element to form pockets or cavities in the sheet which then can be filled with a fluent or powdered material by means of a pneumatic filling device. Thereafter, the filled pockets are covered and closed with a sheet of material which is bonded to the portions of the film material around the periphery of the cavities to finish the packages. A plurality of the individual packages can be folded together to form a generally square multi-compartment package.

The prior packages, when filled with a material which has substantial form retaining properties, are firm enough to withstand handling and shipment. However, with some materials of a less-form retaining type such as flour, cake mixes and the like, there is danger of deformation of the packages unless they are placed in cartons or protective covers.

In accordance with the present invention I have provided a method of producing reinforced packages made out of thermo-plastic sheet material whereby the resulting product has excellent form retaining properties, and can withstand rough handling and impact.

More particularly, I have found that a reinforcing element can be placed on the outside of or inside the cavities formed in the sheet material so that the reinforcement becomes a part of the finished package and reinforces its sides and/or ends and thereby affords the necessary protection to the product.

For a better understanding of the present invention reference may be had to the accompanying drawings in which:

Figure 5 is a perspective view of a partially completed multi-compartment package embodying the present invention;

Figure 6 is a view in cross section taken on line 6—6 of Figure 5;

Figure 7 is a view in section taken on line 7—7 of Figure 5;

Figure 8 is a view in cross section of the finished package shown in folded condition with the reinforcements disposed around the outside of the package;

Figure 9 is a perspective view of a portion of a modified type of sheet containing cavities and having reinforcing elements positioned adjacent to the pockets;

Figure 10 is a view in cross section through a filled package of the type utilizing a reinforcing element of the kind shown in Figure 9;

Figure 11 is a plan view of a modified form of sheet having a plurality of pairs of filled cavities therein and and being partly broken away to disclose the reinforcing elements for the packages formed from the sheet;

Figure 12 is a view in cross section taken on line 12—12 of Figure 11 illustrating the folding of the cover flaps for the packages;

Figure 13 is a view in longitudinal section of the package shown in Figure 12 illustrating the folding of the individual containers to form a completed package;

Figure 14 is a view in section taken on line 14—14 of Figure 13;

Figure 15 is a schematic illustration of a modified form of machine shown partly broken away and in section illustrating formation of a modified form of package;

Figure 16 is a view in cross section taken on line 16—16 of Figure 15;

Figure 17 is a view in cross section of a pair of composite packages secured together with an over-wrap around them; and Figure 18 is a view in cross section taken on line 18—18 of Figure 17.

Figure 1:
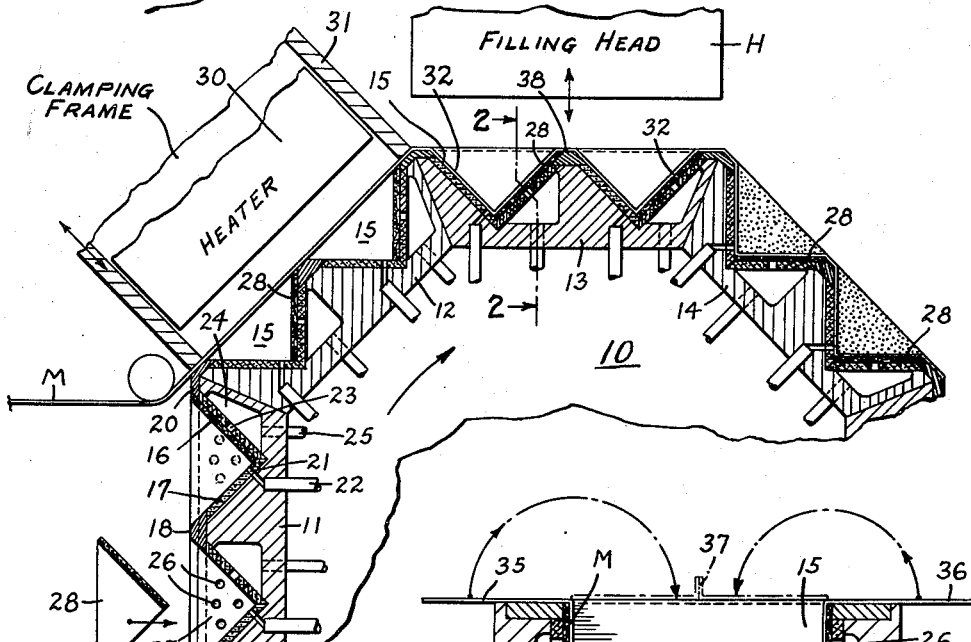
Figure 1 is a schematic illustration of a typical apparatus for practicing the method embodying the present invention, the apparatus being shown partly in section and partly broken away.

The present invention can be practiced with apparatus of the types disclosed generally in my copending applications Serial No. 585,775 and Serial No. 594,152, and it involves generally the techniques of forming and filling packages disclosed in those applications. As illustrated in Figure 1, a typical apparatus may include a rotary mold wheel or drum 10 which is provided with a plurality of mold sections 11, 12, 13, 14, etc., extending around its periphery and each being provided with a plurality of molding cavities 15 arranged in pairs or multiples of pairs extending transversely and lengthwise of the mold sections. As shown in Figure 1, each mold section includes two mold cavities 15 but it is also possible to have more than two rows of cavities and more than one cavity in each row. As illustrated, the side walls of the mold cavity are formed of porous sintered metal plates 16 and 17 arranged at an angle to each other and held in position by means of cap pieces 18, 19 and 20. The plate 17 is provided with openings 21 near its inner edge which are adapted to be connected to a pipe 22 communicating with a manifold and vacuum pump (not shown) as described more particularly in application Serial No. 585,775. Similarly, the plate 16 has openings 23 therein communicating with a chamber 24 which also is connected to the manifold by means of a pipe 25. A plurality of openings 26 are also formed in the ends 27 of the mold cavities and they also communicate with the vacuum pump. All of the openings 21, 23 and 26 are exaggerated in size in the drawings.

In operation, each of the mold cavities 15 receives a reinforcing element 28 which is held in the mold cavity by suction exerted through the openings 23 and 26. The mold cavities containing the elements 28 are then moved beneath an electric heater 30 or its equivalent and the clamping frame 31 and a sheet of thermo-plastic material M such as polyethylene, polyvinyl or the like is fed between the heater and clamping frame and the open mold cavities 15. The heater 30 softens the sheet material M while the frame 31 clamps the sheet against the mold element 12 around the outer edges of the cavities 15, 15. When the material is softened, the pressure in the mold cavities is reduced by the vacuum pump to shape the plastic material into conformity with the shape of the mold cavities 15, 15 and the inner face of the reinforcement 28 in the cavity. The clamping frame 31 retains the film in tight engagement with the cap pieces 19 and 20 of the mold section so that smooth and uniformly shaped cavities or pockets 32, 32 are formed in the film at a zone corresponding to each of the mold cavities.

The mold drum 10 then advances one step to bring the mold cavity containing the reinforcement and the sheet M with the preformed cavities 32, 32 therein beneath the filling head H where the fluent or powdered material is introduced into the pockets filling them. The filling head may be of the kinds shown in either of co-pending applications Serial Nos. 585,775 and 594,152, and may include a structure for compacting the fluent material in the cavities 32, as shown in co-pending application Serial No. 595,249.

After the cavities 32 are filled, the drum rotates to move them to a position where they are closed or covered as described in greater detail hereinafter.

Figure 3:
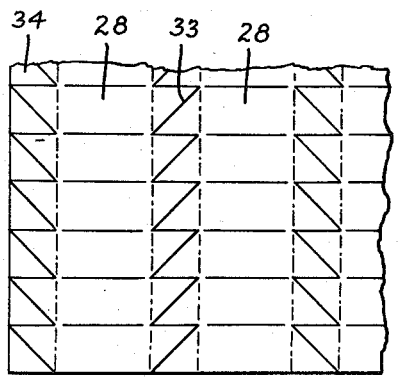
Figure 3 is a plan view of a sheet of reinforcing material illustrating the manner in which reinforcing elements for the packages can be cut from the sheet.
Figure 4:
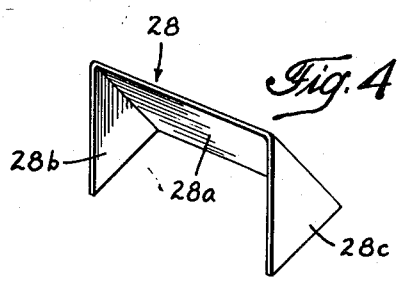
Figure 4 is a perspective view of a folded reinforcement for one of the packages.

As indicated in Figure 1 of the drawing and shown more particularly in Figures 3 and 4, a suitable type of reinforcing element 28 may be formed from thin cardboard, heavy waxed paper or other relatively stiff sheet material. Each reinforcing element includes a generally rectangular mid-portion 28a which corresponds to a side 16 or 17 of the mold cavity and it includes triangular end portions 28b and 28c which correspond to the cross section of the cavity or the shape of its ends.

It will be understood, of course, that the shape of the triangular end portions can be modified, depending upon the shape of the package to be produced and that the reinforcing element, if desired, can be so designed and constructed that it will cover the opposite sides 16 and 17 of the cavity while leaving the ends 27 open for escape of air therethrough.

The reinforcement 28 shown in Figure 4 can be readily produced with a minimum of waste in the manner shown in Figure 3. Thus, oppositely facing rows of the reinforcements 28 may be struck out of the sheet material with their end edges complementarily disposed so that they can be shaped by a zig-zag cut 33 between each row of reinforcements. The only waste will be the small triangular sections 34 at each edge of the sheet.

As indicated above, the unit packages are completed by covering the open sides of the cavities 32 in a suitable way and thereafter folding or re-arranging the unit packages so produced to give maximum protection to the contents by means of the plastic covering and the reinforcing elements 28 associated therewith.

Figure 2:
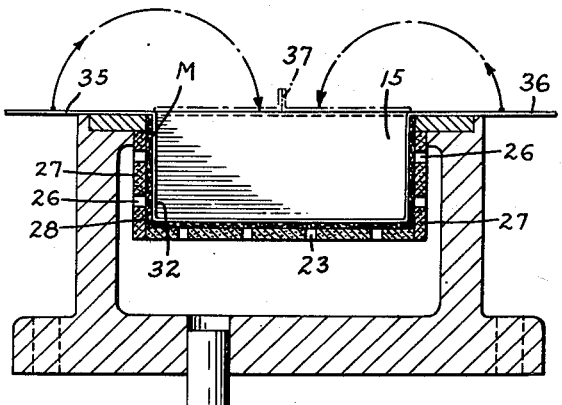
Figure 2 is a view in cross section through the apparatus taken on line 2—2 of Figure 1.

As shown in Figure 2, the mold cavities 15 are shorter than the width of the sheet M so that the edge portions 35 and 36 of the sheet material M extend outwardly beyond the ends 27 of the mold cavities. When the cavities 32 formed in the material M are filled, the edge portions 35 and 36 are folded over and sealed to the portion of the sheet around the cavities 32, 32 and their edges brought into abutting relation to form a fin seal 37 extending transversely of the packages as shown in Figures 2 and 5. After the fin seal 37 has been formed, it can be folded flat against the adjacent side of the package as shown in Figures 5 and 6. Thereafter, the two triangular packages are folded along the center of the web portion 38 between them to form a generally square package as shown in Figure 8. Overlapping flanges 39 and 40 at the outer edges of the package can be spot sealed permanently or releasably. In the form of package just described, the reinforcements 28 on opposite sides of the package extend around both ends and around two sides of the package to form a stiff and sturdy peripheral enclosure for the composite package. Moreover, additional reinforcement is afforded by sheet portions 35 and 36 extending diagonally through the package.

While it is preferred to fold the edges 35 and 36 of the sheet over the package or otherwise provide a cover sheet for the open sides of the individual packages or pockets, it will be understood the side edge portions 35 and 36 can be omitted and the sheet can be folded to place the filled and uncovered cavities therein into face-to-face engagement without the intervening sheets 35 and 36 thereby forming a single block of material enclosed within the film material and having the reinforcements extending around two of its sides and its ends.

While the cover flaps 35 and 36 may be continuous with the remainder of the web, as shown in Figures 9 and 10, it is possible to form the cavities 45, 46, etc., in a narrower sheet or web 47 and to secure cover strips 48 and 49 to the edges of the sheet 47 by means of overlapped seams 50, 51. The edge strips 48 and 49 are folded over to form the closures and the seal 52 extending along the center line of the packages. Thereafter, the packages with the reinforcing elements 28' are folded to form the rectangular double-compartment packages disclosed in Figure 8.

Figures 11 to 13 show another method of assembling the packages into generally square cross-section, multiple compartment units. As shown in Figures 11 and 12, a sheet of thermo-plastic material 55 is draped and shaped over pairs of molds arranged in rows so that two cavities or pockets 56 and 57 are formed in end-to-end relation transversely of the web 55. Also shown in Figure 11, the reinforcements 28" are arranged outside the cavities 56 and 57 in oppositely facing relation. After the cavities 56 and 57 are filled, the edge portions 59 and 60 of the web 55 are folded over to overlap the web portion 61 between the ends of the cavities 56 and 57 and are sealed to the sheet 55 around the peripheries of the cavities 56 and 57. Each package is closed by the edge portion 59 or 60 of the web. The pairs of packages 62 and 63 can be separated by cutting sheet 55 transversely and they may then be folded along the center line of the web 61 into the position shown in Figures 13 and 14 in which the flaps 59 and 60 are disposed between the packages and the reinforcing elements 28" extend around the ends and along the two opposite sides of the package.

While each of the packages described above has its closure or cover flap formed of the same or similar material as the sheet containing the recesses or cavities for receiving the fluent material, it will be understood that the open sides or mouth of the cavities may be covered by means of separately supplied sheets. Moreover, the reinforcements can be placed within the packages.

Figures 15 and 16 illustrate a modification of the apparatus and method described above to produce such packages. As shown in Figure 15, the apparatus includes a mold wheel 70 having molding cavities 71, 72 formed in each section 73 thereof. A clamping frame 74 for holding the plastic film material M' against a mold section 73 is disposed in spaced relation to the filling head 75. In this way, the thermo-plastic sheet material is fed between the heater 76 within the clamping frame 74 and the mold cavity 71 and 72 and when a reduced pressure is exerted through the pipes 77 and 78 communicating with the bottoms of the cavities 71 and 72 therein, the sheet material is stretched to fit the interior of the molds and form cavities therein. Thereafter a reinforcing element 79 similar to the element 28, is introduced into each of the cavities 80, 81 formed in the sheet material. The mold drum then carries the cavities 80, 81 beneath the filling head 75 where the fluent material is introduced into the cavities 80 and 81 to fill them. After filling the cavities 80 and 81, they pass beneath a sealing head 83 of polygonal formation having cutting knives 85 at each of its corners by means of which the continuous cover sheet 36 can be cut into pieces of proper size to cover the filled cavities 81 and 80 and overlap and be secured to the web portion 87 extending around the periphery of the cavities and the web portion 88 between the cavities. In order to hold the severed sections 90 of the sheet material on the sealing head 83 after the sheet is cut by the knives 85, a fixed suction manifold 91 (having a suction connection 91') is provided at the end of the sealing head so that the recesses 92 and 93 behind the severed sections 90 of the sheet may be maintained at a reduced pressure until the severed sections are applied and secured to the web portion 87. Moreover, the pressing head is heated in any suitable way as e.g., by means of an electrical heating element (not shown) so that when the head 83 is brought down into contact with the mold drum, the severed section 90 of the sheet 86, e.g., is sealed to web portions 87, 88, thereby sealing the cavities and enclosing the material therein. If desired, a slight pressure may be introduced (through pipe 93') to facilitate the removal of the severed portion from the sealing head. It will be understood that the completed packages are then separated from the sheet M' by means of a cutting device 95.

After completion of the packages 96 and 97, they are ejected from the mold cavities 71 and 72 and the unit packages 96 and 97 folded into face-to-face relation to provide square cross-section multi-compartment packages like those described above.

The folded packages may have the webs or fins at their edges heat sealed or otherwise joined together. A plurality of the multi-compartment packages can be provided with an over-wrap 98 of plastic material, coated paper or the like as shown in Figures 17 and 18. In order to produce a more attractive package and reduce the air space within the over-wrap 98 to a minimum, the fins at the edges of the packages may be folded against the side of the package. Thus the fins 99 which extend lengthwise of the package may be folded against one side while the end fins 100 shown in Figure 18 may be folded against the ends of the package and flattened out to conserve space. Due to the extremely thin nature of the film material from which the wrappers are made, the air spaces are actually only a few thousandths of an inch thick.

While the invention has been described with reference to the provision of multi-compartment or single compartment packages of generally square cross-section, it will be understood that the shape of the cavities in the mold drum may be semi-cylindrical, trapezoidal or even almost rectangular in shape due to the fact that the material introduced into the packages is somewhat deformable thereby allowing the packages to be ejected from the mold cavities without sticking.

From the preceding description of typical embodiments of the present invention, it will be understood that the packages and their production are susceptible to considerable modification. Accordingly, the forms of the invention described herein should be considered as illustrative only.

I claim:

1. A method of making and filling packages comprising heating a sheet of thermo-plastic material to soften it, subjecting opposite sides of said sheet to different pressures to form at least two adjacent cavities in said sheet, applying reinforcing elements to the sheet adjacent at least one side of each cavity, filling said cavities with a fluent material, and folding said sheet to bring the filled cavities in superimposed relation to form a package having said reinforcing elements extending along at least two different sides of said package.

2. The method set forth in claim 1 in which a cover sheet is applied and sealed to said thermoplastic sheet around said cavities to close said cavities after they are filled.

3. The method set forth in claim 1 in which each cavity is of triangular cross-section and has rectangular closed sides and a rectangular open side, and said reinforcing element has a rectangular portion corresponding to one side of said cavity and triangular end portions corresponding to the cross-section of said cavities.

4. The method set forth in claim 1 in which said reinforcing elements are applied to the outside of said cavities.

5. The method set forth in claim 1 in which the reinforcing elements are applied to the interior of said cavities.

6. The method set forth in claim 1 comprising folding portions of said thermo-plastic sheet over said cavities and sealing said portions to said sheet around said cavities to close said cavities after they are filled.

7. The method set forth in claim 6 in which the sheet is folded to dispose the sides of the cavities closed by said folded portions in opposed relation.

8. The method set forth in claim 6 in which edge portions of said folded portions are sealed to each other to form a fin seal extending transversely of said cavities.

References Cited in the file of this patent

UNITED STATES PATENTS

| | | |
|---|---|---|
| 1,830,342 | Stokes | Nov. 3, 1931 |
| 2,219,578 | Pittenger | Oct. 29, 1940 |
| 2,328,798 | Gardner | Sept. 7, 1943 |
| 2,331,762 | Brown | Oct. 12, 1943 |
| 2,364,012 | Walton et al. | Nov. 28, 1944 |
| 2,521,403 | Overland | Sept. 5, 1950 |
| 2,532,871 | Wagner | Dec. 5, 1950 |
| 2,603,350 | Lehman | July 15, 1952 |
| 2,633,986 | Vogt | Apr. 7, 1953 |